Patented Jan. 24, 1950

2,495,216

UNITED STATES PATENT OFFICE 2,495,216

METHOD OF MANUFACTURING PROPELLANTS

Paul A. Longwell, Alvin D. Ayers, and Bruce H. Sage, Pasadena, Calif., assignors to the United States of America as represented by the Secretary of the Navy No Drawing. Application August 7, 1944, Serial No. 548,514

3 Claims. (Cl. 52—22)

This invention relates to a method of manufacturing propellants and has particular relation to a method of preparing the ingredients of a double base propellant to render it suitable for solventless extrusion into single grain propellant charges for use in rocket motors and the like.

The two principal methods of manufacture of double base propellant presently used are the solvent process and the hot rolling process, each of which possesses certain advantages as well as certain disadvantages. In the solvent process, the ingredients of the double base propellant are mixed and colloided in the presence of a volatile solvent. The resulting composition is subsequently extruded into the form of tubes, the tubes being then extruded into the form of grains, and dried in finished form. This method is relatively inexpensive, and the hazards of accidental explosions are reduced by diluting the nitroglycerine with acetone before mixing it with nitrocellulose. The mixing is carried out at fairly low temperatures. The main disadvantage of the solvent process resides in the extremely slow drying of the extruded grains, for the length of the drying period increases roughly as the square of the web thickness. Thus, grains which are practicable to prepare by this process are necessarily limited to small webs, and even so, the amount of powder in process at any one time may amount to several weeks' production. Furthermore, the final size and shape of the grain cannot be controlled with close tolerances, thereby necessitating a large quantity of rejects which must be reworked, with a consequent increase in cost and amount of material in process.

Although the hot rolling process is more hazardous than the solvent process it is a shorter process and requires less time. It involves mixing a water emulsion of nitroglycerine and other ingredients with moist nitrocellulose. The mixture is then prerolled in hot differential rolls, held in a dry house for a period of time and then rolled in two stages into sheets. The sheets are cut and dry extruded into the desired shape and size. Grains which are several inches in diameter have been extruded by this process since there is nothing inherent in the process to restrict the upper limit of the grain size. Accurate control of the grain dimensions is possible and any rejected material which is reworkable may be easily re-extruded.

An object of the present invention is to combine the advantages and eliminate the disadvantages inherent in the methods heretofore practiced in the preparation of double base propellant material.

The constituents and proportions of the resulting propellant may be substantially identical to conventional propellants such as those known in the art by the trade name "Hercules Bullseye" or those prepared in accordance with "Army Specification PXS 633, Revision 5". It will be understood that the present invention includes the incorporation of other materials, such as opacifying agents which are disclosed in a copending application, Serial No. 479,538, filed March 17, 1943, stabilizers, plasticizers, inorganic salt gelatinization accelerators and other additives.

Another object of the present invention is to provide a method of preparing a double base propellant material which will be in an ideal physical state for dry extrusion.

Still another object of the invention is to provide a method of preparing a double base propellant material which reduces handling of the nitroglycerine and nitrocellulose ingredients to a minimum, and during such handing as well as storage of these materials, maintains them in an insensitive state by the use of an appropriate diluent so as to minimize the detonation and deflagration hazard.

A further object is to provide a method whereby propellant grains of any desired size and shape may be obtained with virtually no permanent waste of material, due to the fact that the material may be readily reworked.

A still further object is to provide a method which is particularly rapid, the elapsed time from mixing the raw ingredients to extrusion of the propellant grain being a matter of less than six hours, in contrast to the several days or weeks required in the execution of the previous methods, thus keeping at a minimum the amount of material in process and accordingly reducing the hazards of accidental detonation and deflagration involved.

Another object is to provide a method which substantially reduces the number of operations heretofore required for the preparation of double base propellant materials and makes possible their execution with a minimum amount of material, a minimum number of personnel and a minimum possibility of premature detonation and deflagration.

Another object is to provide a method which is capable of continuous and inexpensive operation and which may be performed with conventional equipment.

An additional object is to provide a method of preparing a propellant for dry extrusion which is accomplished by depressing the extent of colloiding of a double base propellant mixture to such a degree that the partially decolloided material, when dried, can be extruded in the absence of solvent to form a propellant grain. These and other objects of the invention will be better understood by reference to the following description.

In a preferred method practiced in accordance with the present invention, nitroglycerine is diluted at the earliest possible moment with four or five parts of acetone by volume. The proportions are not critical, but as the proportion of acetone is increased, the nitroglycerine becomes more insensitive. Small proportions of ethyl or methyl alcohol may be included in the acetone solvent if desired. Small weight fractions of such conventional substances as stabilizers and plasticizers are added to the acetone, either prior to or after diluting the nitroglycerine. An opacifying agent such as dispersed carbon black is added in proportion of about .001 weight fraction of the finally compounded propellant after removal of the solvent. If the opacifying agent used is carbon black, it is added with the water along with salts as set forth hereinafter. The advantages gained by the addition of the opacifying agent are more fully disclosed in the aforementioned copending application.

It has also been found advantageous to employ a small amount of water in the acetone solution during the mixing process. This is advantageous for a number of reasons including the following:

1. Purified nitrocellulose is conventionally shipped in a water-wet state, so that by including some of this water in the solution, the necessity of dehydration of the nitrocellulose and its attendant expense is eliminated. It should be pointed out that the conventional solvent process requires that the nitrocellulose be dehydrated, this usually being done by the addition of alcohol at considerable material expense. However, if the nitrocellulose has been dehydrated, the residual alcohol need not be removed before use. Although an alcohol such as ethanol serves as a depressant of colloiding action, the amount residual in the dehydrated material is not sufficient to interfere with the present process.

2. The water, when used in limited quantity as a diluent, serves to reduce the viscosity of the mixture when the nitroglycerine and nitrocellulose are mixed and assists in dissolving the components of the mixture.

3. An added quantity of water is utilized as a control agent in order to partially decolloid the mixture and to control the extrudability of the resulting product, as will be more fully explained as the description proceeds.

Although water is preferred, it will be understood that methanol or other alcohols may be employed for viscosity control, either separately or in conjunction with the water.

The quantity of water employed during the dissolving operation, including that initially present in the wet nitrocellulose, is about 0.05 weight fraction of the resulting acetone-water mixture. Other conventional constituents of the propellant, such as inorganic salts and a gelatinizing agent as well as an opacifying agent such as dispersed carbon black, may be added in nominal quantities to the mixture or they may be dispersed or dissolved in the water before being added to the mixture.

The nitroglycerine and nitrocellulose, along with the solvents and desired additive agents are mixed in proportions of about 50 to 60 parts nitrocellulose and 40 to 50 parts nitroglycerine. The other ingredients, exclusive of solvents, total about 1% to 5%. The exact percentages used may be those employed in established formulas, including, but not limited to "Hercules Bullseye" and "Army Specification PXS 633, Revision 5." The solvent ordinarily amounts to approximately 70% to 80% of the total material.

The foregoing ingredients are agitated together in a conventional mixer. As indicated above, the amount of water during initial mixing is limited to the ratio of about 0.05 weight fraction of water to 0.95 of acetone. This is sufficient to reduce materially the viscosity of the whole mixture, but insufficient to cause precipitation or coagulation. After solution or dispersion, and while agitation continues vigorously, more water is incorporated into the mixture until it partially decolloids with only slight coagulation. The weight fraction of water to bring about this condition is preferably between 0.10 and 0.16, based upon the weight of the whole mixture.

A suitable coagulation control agent such as methyl cellulose may be added with the water in order to reduce the rate of growth of the particles formed by coagulation. The resulting suspension is immediately spread by conventional means on the outer surface of a drum dryer to form a film which is preferably about 0.010 to 0.025 inch in thickness. The dryer is internally heated and hot air is circulated over the surface of the film in order to decrease the drying time required. The major proportion of the water and acetone solvent is removed by such drying.

The film is stripped or flaked off and reduced in size by cutting to flakes, each flake being roughly about four square inches in area. The remainder of the acetone solvent and the water is removed by passing the flakes through a rotary dryer through which is passed a stream of heated air flowing counter-current to the direction of the flakes. The dried flakes have a physical appearance very similar to rough paper and are somewhat fibrous in character.

The acetone may be readily reclaimed from the first drum dryer by passing the vapors into an absorption system employing chilled water as a medium. Sufficient water is used to dissolve and render insensitive any nitroglycerine that may be present. Thereafter, the solvent may be recovered by fractionation after the dissolved nitroglycerine is hydrolyzed with sodium hydroxide.

After drying, the flakes, while being maintained at a temperature substantially below their melting point, are macerated and then extruded in the form of the desired grain. This is conveniently accomplished by placing the flakes in an extrusion chamber having suitable macerating means internally mounted therein and terminating in a forming die. The flakes are forced through the extrusion chamber, the macerating means and the forming die by a pressure plunger. The extrusion chamber is provided with a heating jacket in order to maintain the flakes at a moderate temperature while they are being macerated and extruded.

Drying conditions may vary and cause variations in the physical properties of the film formed on the drum. This may be counteracted by adjustment of the water concentration which serves to provide an excellent control.

The total elapsed time required to carry out the present process, from the raw material to the finished grain, need not be greater than six hours. This is highly important, as only a minimum amount of material need be in process at any one time, thus reducing correspondingly the hazards involved.

It should be emphasized that the step of partially decolloiding the mixture is of primary importance, for it makes possible the very desirable step of "dry" or "solventless" extrusion of the propellant material; that is, extrusion of the propellant material after rather than before the solvents or diluents have been removed. In other words, the partially decolloided, solvent-dry flakes readily bond together without cracks or voids when subjected to the pressure and moderate heat incidental to extrusion through an extrusion die. On the other hand, dry extrusion of a fully colloided mixture is virtually impossible as the fully colloided flakes do not bond together and the extrusion product disintegrates and develops cracks and flaws.

We have found that dry extrusion offers a number of advantages including the following:

1. The propellant grain may be produced in any size within the limits of the capacity of the extrusion apparatus; that is, the grains may vary from a fraction of an inch to several inches in diameter, and if desired, they may be several feet long.

2. Irrespective of grain size, the dimensional tolerances may be held to close limits.

3. The processing period is not increased with increased grain size.

4. Rejected grains and trimmings may be immediately returned to the extrusion chamber for re-extrusion along with new stock.

5. The extruded grains may have a wide variety of shapes to meet the various conditions. For example, if the propellant is to be used in a rocket motor, its cross section is chosen to provide the desired burning or deflagration rate; that is, it may be tubular with various external or internal ribs, or of cruciform section, or otherwise shaped to provide the desired surface area throughout its burning life. In many cases, the overall dimensions of grain are such that a single grain fits the rocket motor shell.

One reason that conventional solvent-extruded grains are limited to small sizes is because of the excessive drying period required for their manufacture. Even small size grains ordinarily require a period varying from several days to weeks to dry after extrusion. When grains of several inches diameter are attempted, the drying period runs into months, and even then the solvent is not fully removed. Furthermore, evaporation of the solvent causes substantial shrinkage so that close dimensional tolerances cannot be attained. In addition, a large percentage of grains must be rejected and much time and effort are required to re-soften the grains for re-extrusion.

It will be noted that in the present invention approximately four times as much solvent is used as is used in the conventional solvent process and that the resulting mixture is a mobile liquid. The excess solvent is employed without waste as most of the solvent may be recovered and used again. In the conventional solvent process no more solvent is used than is absolutely necessary due to the problem of drying the extruded grains; that is, just enough solvent is used to render the mass plastic, rather than fluid as in the present process.

While a large quantity of solvent is preferred in the practice of the present invention, it will be noted that the present invention may be utilized to modify the conventional solvent process for the manufacture of grains of double base powder.

In the conventional process as commonly operated, the ingredients of the powder are intimately mixed together in the presence of a sufficient quantity of solvent, such as acetone together with any alcohol left from dehydrating the nitrocellulose, to give a pasty, dough-like mass. During this mixing, the nitrocellulose is gradually incorporated with the liquid plasticizers, including nitroglycerine, with the assistance of the solvent. This incorporation or colloiding is extended during subsequent extrusion steps in the presence of the solvent. The final extrusion may leave the material in shapes suitable for cutting into lengths as grains, but these grains must be "dried" to remove nearly all of the solvent and this limits them to relative small web thicknesses.

Also, the material may be extruded in the form of thin strands or ribbons from which the solvent may be effectively removed. However, the resulting dried material is very difficult to extrude again to give satisfactorily homogeneous grains of desired web thickness, since the highly colloided material has surfaces which do not bond together in the extrusion press even when relatively high pressures are utilized. This difficulty is eliminated and good extrusion results are obtained by utilizing the procedure of the present invention which includes the prevention of complete colloiding for the purpose of rendering the resulting dried material susceptible to satisfactory dry extrusion. This is accomplished by the addition of a sufficient amount of a decolloiding agent, such as water or an alcohol, to the materials being mixed with the solvent in order to permit only partial colloiding and to prevent the complete colloiding of the nitrocellulose. The quantity of the decolloiding agent to be used is, of course, dependent upon the amount of solvent and proportions of nitroglycerine and nitrocellulose and can best be determined by adding more or less of the decolloiding agent to the particular composition being processed to give the extrusion characteristics desired of the dried strands. The resulting product, except for shape, is essentially the same in physical characteristics as the flakes which are prepared for the extrusion press, and may be placed in the press and extruded in a manner similar to that described in regard to the flakes.

We claim:

1. The method of preparing a double base propellant grain which comprises the steps of colloiding the components of a nitrocellulose-nitroglycerine base powder composition to form a colloidal mixture by dissolving said composition in a solution of acetone and water, the initial weight ratio of said solution being approximately 0.95 weight fraction of acetone and 0.05 weight fraction of water, incorporating into the resulting colloidal mixture by agitation an additional weight fraction of water as a decolloiding agent in an amount sufficient to cause less than complete decolloiding of the mixture, spreading the resulting partially decolloided mixture into the form of a thin film, drying said film, reducing said film to flake form, and finally extruding said flakes through an extruding die in the form of a finished propellant grain.

2. The method of preparing a double base propellant grain which comprises the steps of colloiding the components of a nitrocellulose-nitroglycerine base powder composition to form a colloidal mixture by dissolving said composition in a solution of water and acetone having the weight ratio of approximately 0.95 acetone and 0.05 water based upon the weight of said solution, partially decolloiding the resulting colloidal mixture by incorporating therein by agitation a sufficient amount of water to increase the weight fraction of the water in the mixture to between 0.10 and 0.16, spreading the partially decolloided mixture into the form of a thin film having a thickness varying from 0.01 to 0.025 inch when dried, drying said film, reducing said film to flake form and finally extruding said flakes through an extruding die in the form of a finished propellant grain.

3. The method set forth in claim 1 wherein the decolloiding agent is selected from the group consisting of water, alcohol and a solution thereof.

PAUL A. LONGWELL.
ALVIN D. AYERS.
BRUCE H. SAGE.

REFERENCES CITED

The following references are of record in the file of this patent:

UNITED STATES PATENTS

| Number | Name | Date |
|---|---|---|
| 1,640,712 | Moran | Aug. 30, 1927 |
| 2,121,138 | Wiggam | June 21, 1938 |